No. 719,508. PATENTED FEB. 3, 1903.
A. F. RIETZEL.
CLAMP DEVICE FOR ELECTRIC WELDING MACHINES.
APPLICATION FILED JUNE 14, 1902.
NO MODEL. 3 SHEETS—SHEET 2.
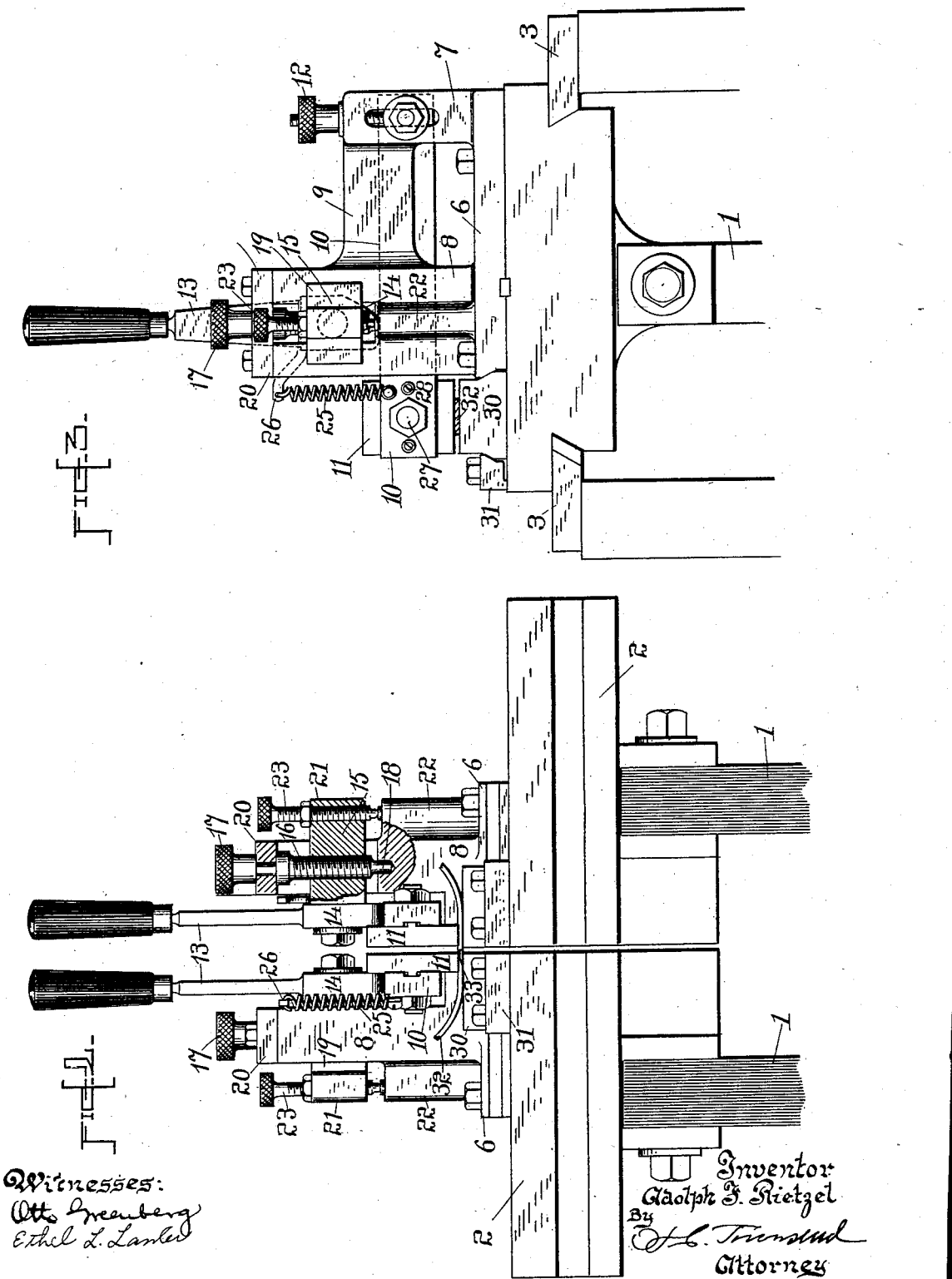
Witnesses:
Otto Greenberg
Ethel L. Lawler
Inventor
Adolph F. Rietzel
By
H. C. Townsend
Attorney No. 719,508. PATENTED FEB. 3, 1903.
A. F. RIETZEL.
CLAMP DEVICE FOR ELECTRIC WELDING MACHINES.
APPLICATION FILED JUNE 14, 1902.
NO MODEL. 3 SHEETS—SHEET 3.
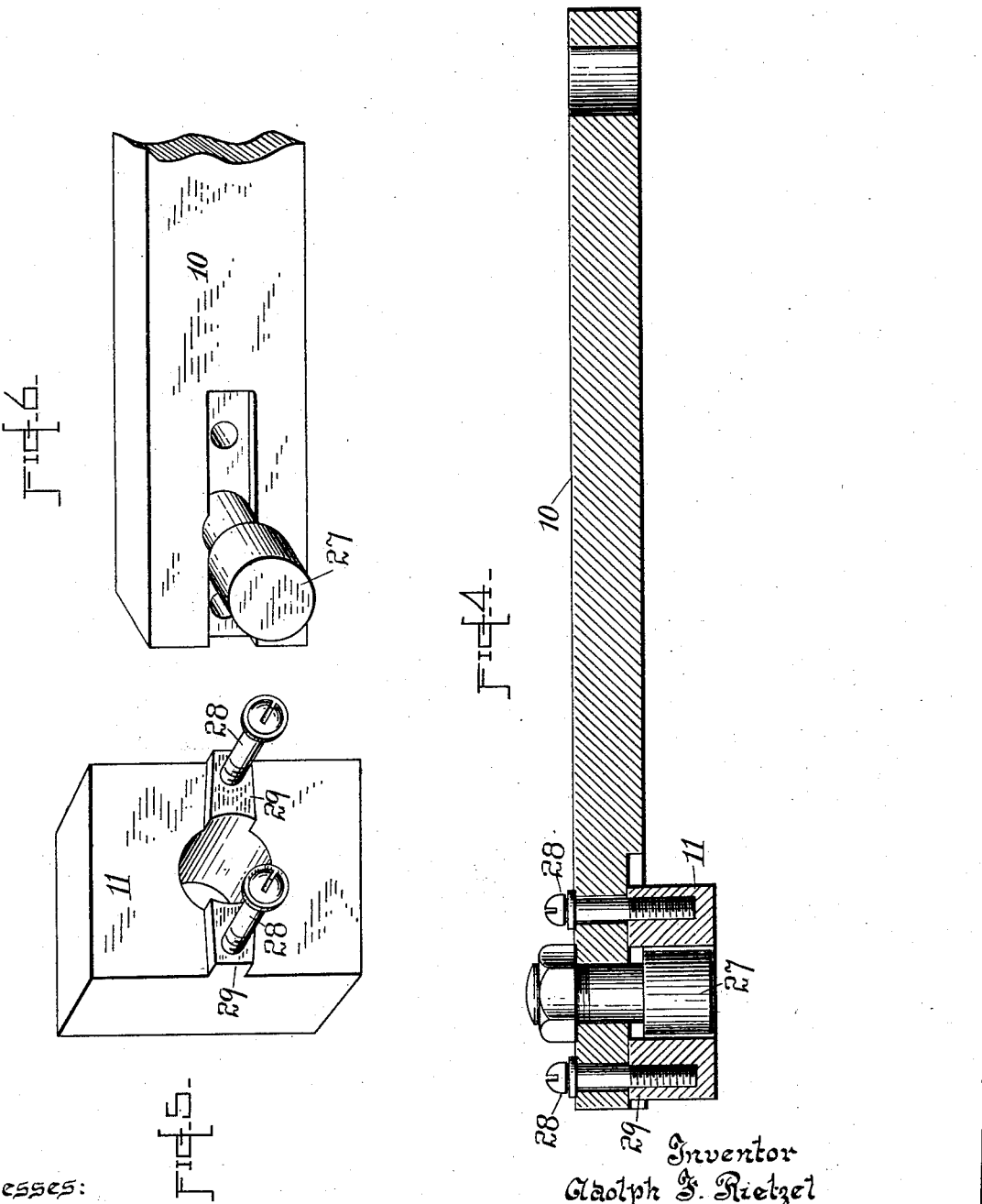
Witnesses:
Otto Greenberg
Ethel L. Lawler
Inventor
Adolph F. Rietzel
By
S. C. Townsend
Attorney

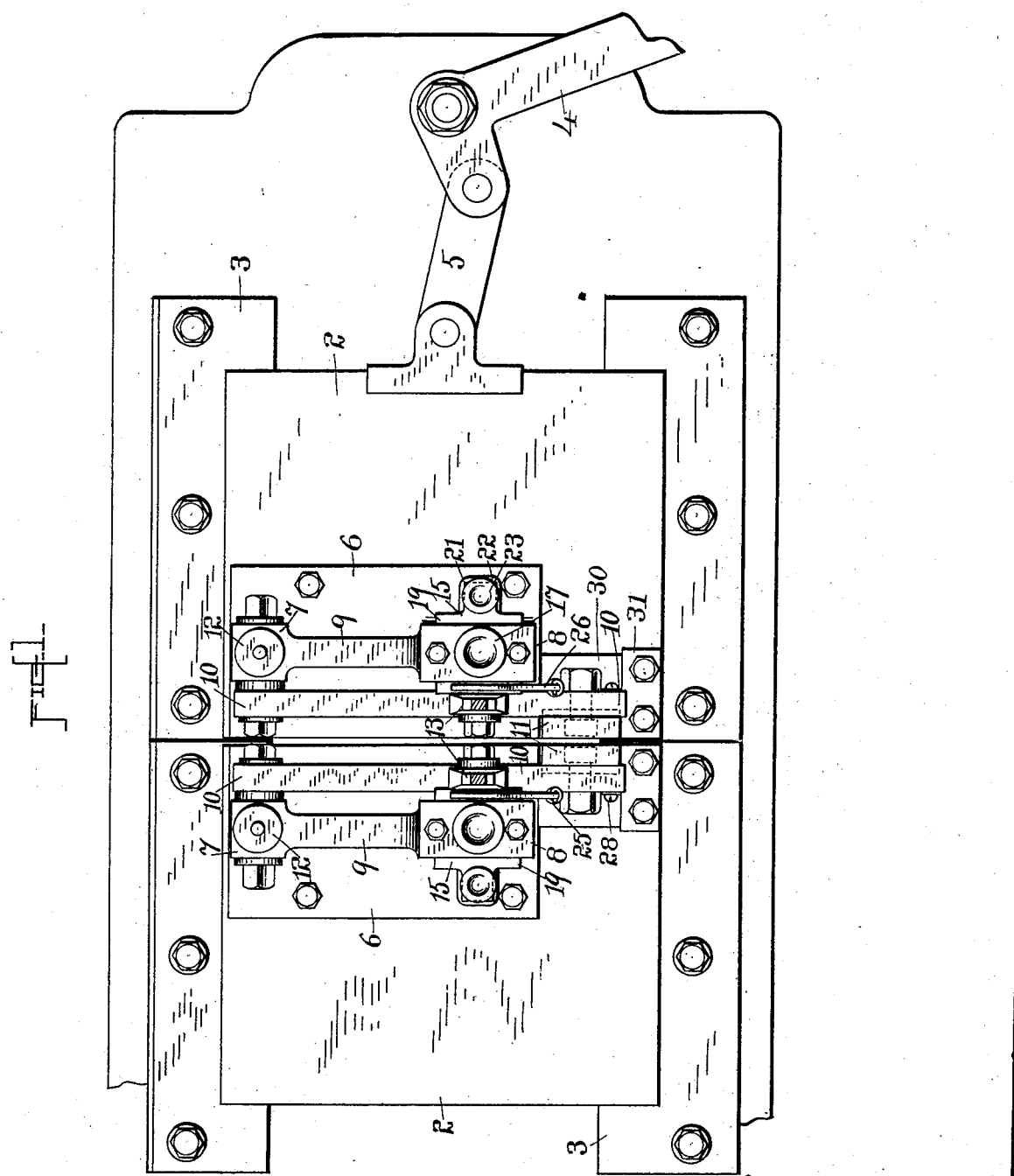

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

CLAMP DEVICE FOR ELECTRIC WELDING-MACHINES.

SPECIFICATION forming part of Letters Patent No. 719,508, dated February 3, 1903.

Application filed June 14, 1902. Serial No. 111,602. (No model.)

*To all whom it may concern:*

Be it known that I, ADOLPH F. RIETZEL, a citizen of the United States, and a resident of Lynn, in the county of Essex and State of Massachusetts, have invented a certain new and useful Clamp Device for Electric Welding-Machines, of which the following is a specification.

My invention relates to clamping devices designed more particularly for use on electric welding or metal-working machines, and is especially adapted for clamping flat stock formed into rings, bands, hooks, &c., straight pieces, and angle-work. The devices are also adapted for holding round and square stock to be welded or otherwise worked when electrically heated.

The successful operation of electric welding-machines depends almost wholly upon the construction of the clamping devices, which have to be adapted for various kinds of work and which must, moreover, be capable of holding the work tightly and be so constructed that the work may be quickly put in and taken from the clamps. They must also be strong enough to hold the work firmly in the jaws without slipping when the pressure is applied to complete the weld or perform other operations when the metal has been softened by the current to the required degree.

The principal object of my invention is to provide a clamping device that may be operated with great rapidity and which shall also clamp the work evenly over its entire width, which is very essential, especially for welding thin stock.

A further object of my invention is to provide a simple and effective construction whereby the clamping devices may be adjusted for different thicknesses of stock and to further overcome any tendency of a distortion or twisting of the clamp-supporting frame or body by the application of pressure to the clamp-jaw for the purpose of setting it down upon the work.

To these ends my invention consists of the improved constructions and combinations of levers, cams, and jaws, with means for adjusting them, as hereinafter more particularly described, and then specified in the claims.

My invention consists also in details of construction, as more particularly hereinafter set forth and claimed.

In the drawings, Figure 1 is a plan of an apparatus constructed in accordance with my invention. Fig. 2 is a front elevation of the apparatus. Fig. 3 is a side elevation thereof. Fig. 4 is a longitudinal section through the lever which carries one of the clamping-jaws. Fig. 5 is a perspective view showing the form of the clamp-jaw itself. Fig. 6 is a perspective view of the end of the jaw-carrying lever, showing the stud which supports the jaw.

1 indicates the terminals of the secondary of an induction-coil which supplies heating-currents to the apparatus, as usual in the art. These terminals are for any source of current, preferably alternating current. Secured to them in any suitable manner are the platens or blocks 2, of some good conducting material, like copper, one of which is supported upon guides 3 and is capable of being moved toward the line of welding or forming by the operation of a lever 4 and link 5, connecting the same with the platen, as usual in the art. Upon the platens 2 are mounted the clamp devices for holding the work. Each platen is provided with a set of clamping devices, and a description of one will suffice for the other.

6 is a base-plate of the frame or body on which the clamping devices are mounted and which is detachably bolted to the platen 2. From the plate or base 6 rise two posts 7 and 8, connected, preferably, by the strut 9 to strengthen the frame against strain applied in the act of clamping the upper jaw down upon the work. Upon the post 7 is pivotally mounted the lever 10, which carries the upper clamping-jaw 11 at its farther end. The pivotal end of the lever is mounted on a block vertically adjustable and guided upon the post 7 by means of a nut 12, engaging with a threaded bolt attached to said block and operating in obvious manner to change the height of the fulcrum or pivotal point of the lever above the base 6 of the frame. This adjustment provides for considerable variations of thicknesses in the work to be clamped by the jaw 11.

13 is the usual jaw-actuating lever employed for forcing the jaw down upon the work. Said lever is furnished at its lower end with a cam 14 for this purpose. The pivotal support for the lever 13 is upon a vertically-adjustable block or carrier 15, which is suitably guided on the upper part of the post 8, constituting a part of the frame that carries the clamping device. The block or support 15 is made adjustable up and down on the frame, preferably by means of a screw 16, to which the block or support 15 bears the relation of a nut. The screw 16, as seen more clearly in Fig. 2, carries a thumb-piece 17 and is suitably mounted in the frame and has a bearing at its lower end, as shown at 18, in said frame. The block 15, guided in an opening in the post 8, as described, is furnished with ears 19, which hold it against lateral displacement. The guide-opening is closed at its top by the detachable plate 20, which permits insertion or removal of the block or carrier 15, and said plate also forms one of the bearings or supports for the adjustable screw 16, as clearly indicated.

To prevent distortion or twisting of the clamp-supporting frame, and to thereby secure the utmost rigidity of the parts, which is necessary for uniform work, I provide the block or carrier 15 with a laterally-extending arm or projection 21, which has a bearing upon an extension 22 of the post 8, rising from base 6. This arm or projection 21 obviously will tend by engaging the post 22 to prevent the inner end or portion of the block 15 from rising under the strain applied by the cam when the lever 13 is thrown to bring the jaw down upon the work. In other words, it serves to prevent twisting in a vertical plane of the block or carrier 15 and also obviously takes the strain from the upper portion of the frame which carries the screw 16. The arm 21 engages the post 22 by an adjustable abutment furnished by screw 23. By this means a solid engagement of said arm with the base or post rising therefrom is furnished for all adjustments in the height of the block 15, which carries the clamping-lever. The adjustment in the height of the clamping-lever by means of the screw 16 affords a fine or delicate adjustment for varying thicknesses of work, while for a coarser adjustment the pivotal end of the lever should be also adjusted by means of the nut 12. As will be obvious, this double adjustment for larger variations in the size of the work preserves the mechanical relation of the parts and gives a practical parallel motion of the lever carrying the clamping-jaw for all classes or sizes of work.

The retractor-spring which raises the jaw 11 when the cam-lever is turned to release the work is indicated at 25. This spring is attached at one end to the lever 10 and at its other end to an arm 26, connected with a vertically-adjustable block 15 or some other part moving therewith, so that changes in the position of the block will not disturb the tension of the spring. The clamp-jaw 11 is mounted on the inside of the lever 10 to bring the line of pressure as near the line of heating as possible. To enable the clamping devices to accommodate themselves readily to slight irregularities in the form of the work, the jaw is properly mounted on the lever so as to be capable of a slight rocking movement. This may be accomplished by the construction shown in detail in Figs. 4, 5, and 6.

27 is a stud bolted to the lever and adapted to receive the jaw in such manner as to permit it to rock on said stud. 28 represents screws which hold the jaw on the stud. These screws pass through openings in said lever, which are slightly larger than the screw itself, to permit a limited rocking movement. On the face of the jaw next the lever is a tongue 29, which has a slight taper from the center outward and which fits a straight opening formed in the face of the lever. This tongue aids in taking the strain off the clamp, and the taper thereof permits the slight rocking movement which is desirable for small irregularities in the work itself.

The jaw 11 is preferably made of steel, and the other portions of the clamp-supporting frame already described as bolted to the platen 2 are also made of steel or other magnetic material adapted to choke off the flow of any alternating currents designed for the work. The currents are passed mainly to the work through the lower jaw 30 of the clamping device. The jaw 30 is of copper or other good conductor and is in direct union or contact with the platen 2. It is clamped firmly down against the upper face of said platen by the base-plate 6, which is formed, as shown more fully in Fig. 3, with an opening tapering inwardly and adapted to fit down upon the swelling base of the jaw 30, so that the action of the screws 31 or other clamping devices which fasten the clamp down upon the platen will be to firmly secure the lower jaw 30 in electrical union with the platen also.

As will be seen, jaws 30 of different size or shape may be readily substituted for one another in the apparatus by simply detaching the clamp frame or body 6 from the platen.

The device is shown as employed in the operation of welding the two pieces 32 to one another, the line of welding and heating being indicated at 33.

Various changes in the details of construction and form of parts may be resorted to without departing from my invention. Thus, in particular, the means for securing an adjustable abutment between the arm or extension 21 and the base of the clamp-body may be varied, particularly as to the location of the screw.

The manner of supporting the jaw upon the lever hereinbefore described is particularly advantageous in these respects—to wit, that it gives a large surface of stud which shall be in contact with the jaw, while at the same time it permits the jaw to be readily removed by simply turning back the screws 28, so as to be disengaged from the jaw itself, after which the said jaw may be slipped off the stud.

What I claim as my invention is—

1. In an electric metal-working apparatus, the combination substantially as described, of a lever carrying a clamp-jaw, a vertically-adjustable support therefor, a threaded bolt connected to said support and an adjusting-nut.

2. In an electric metal-working apparatus, the combination substantially as described, of a jaw-carrying lever vertically adjustable at its pivoted end, an actuating cam-lever for operating on the jaw-carrying lever to clamp the work, a vertically-adjustable supporting block or carrier on which the cam-lever is mounted, and an adjusting-screw connected with said support for adjusting the position of the same as and for the purpose described.

3. In an electric metal-working apparatus, the combination with a clamp-jaw and lever carrying the same, of a cam-lever, a block or support constituting a nut and supporting said cam-lever, a clamp-frame and an adjusting-screw mounted in said clamp-frame.

4. In an electric metal-working apparatus, the combination substantially as described, with the actuating-lever for the clamp-jaw, of a vertically-adjustable support and an arm extending therefrom and provided with an adjustable abutment device, as and for the purpose described.

5. In an electric metal-working apparatus, the combination substantially as described with the clamping-jaw and actuating-lever, of a support 15 in the form of a nut and upon which said lever is pivoted and two adjusting-screws passing through said nut one adapted to change the position of the lever with relation to the work and the other to furnish an adjustable abutment adapted to take up the strain applied in clamping work.

6. In an electric metal-working apparatus, the combination of a jaw-carrying lever pivoted to one side of the work and adapted to swing in a line transverse to the line of pressure applied to the work when heated, and a clamping-jaw pivotally mounted on a stud projecting from the side of said lever nearest the line of heating and adapted to swing in a line parallel to the plane in which the lever swings, as and for the purpose described.

7. In an electric metal-working apparatus, the combination substantially as described, of a jaw-carrying lever, an actuating cam-lever mounted upon an adjustable support, and a retracting-spring connected at one end to said lever and at the other end to an arm carried by said support.

8. In an electric metal-working apparatus, the combination substantially as described with the frame carrying the clamping device and detachably secured to the platen, of a removable clamp-jaw fastened down by said frame upon the face of the platen, as and for the purpose described.

9. In an electric metal-working apparatus, the combination substantially as described with the jaw-carrying lever, of a jaw mounted on the stud of said lever and having a tapered tongue engaging with a slot in the lever, as and for the purpose described.

10. The combination with the jaw-carrying lever, of a stud projecting therefrom, a jaw mounted to turn on said stud and screws adapted to hold the jaw upon the stud and passing through enlarged openings in the lever, as and for the purpose described.

11. The combination in an electric metal-working apparatus, of a clamping-jaw and support therefor, a stud upon which the jaw is adapted to turn, a tongue or projection by which the lever and jaw are interlocked but which is adapted as described to permit a limited rocking movement of the jaw, and means for detachably holding the jaw upon the stud.

Signed at Lynn, in the county of Essex and State of Massachusetts, this 12th day of June, A. D. 1902.

ADOLPH F. RIETZEL.

Witnesses:
C. I. LINDSEY,
GEO. W. N. CHADWELL.